J. A. Schule,
Motor.

No. 54,220.      Patented Apr. 24, 1866.

Witnesses.      Inventor.

UNITED STATES PATENT OFFICE.

J. ADAM SCHÜLE, OF NEW YORK, N. Y.

IMPROVEMENT IN MOTIVE POWERS.

Specification forming part of Letters Patent No. 54,220, dated April 24, 1866.

*To all whom it may concern:*

Be it known that I, J. ADAM SCHÜLE, of the city, county, and State of New York, have invented a new and Improved Motive Power; and I do hereby declare that the following is a full, clear, and exact description thereof, which will enable others skilled in the art to make and use the same, reference being had to the accompanying drawings, forming part of this specification, in which—

Figure 1:
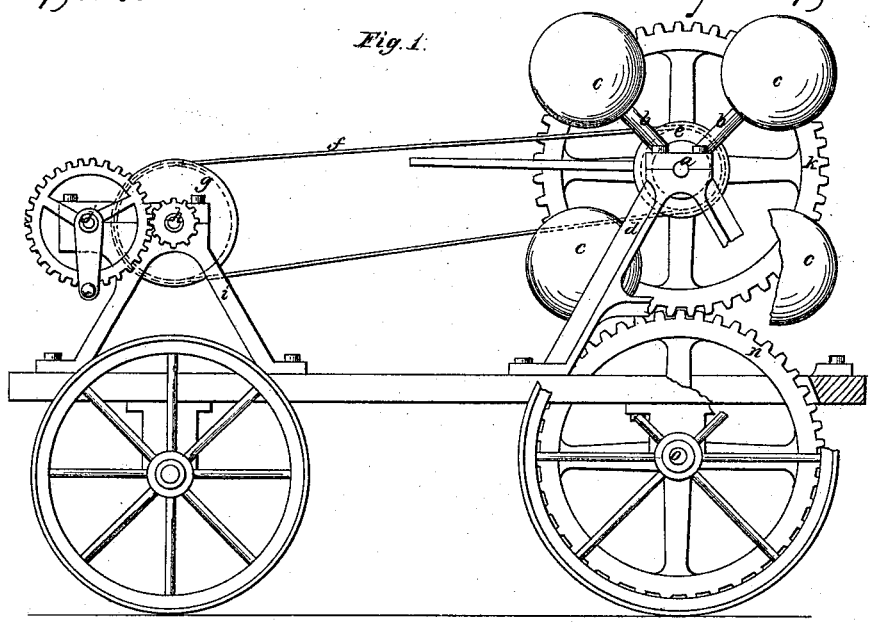
Figure 2:
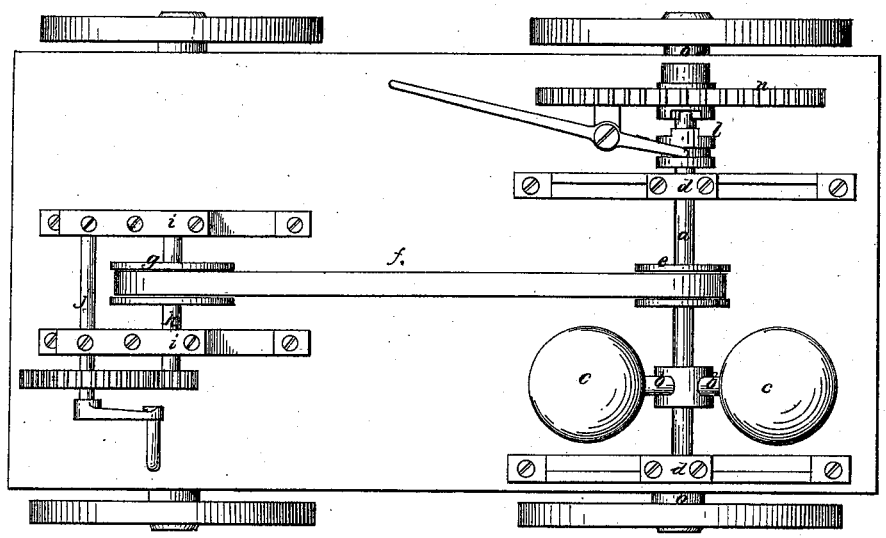

Figure 1 represents a side elevation of this invention. Fig. 2 is a plan or top view of the same.

Similar letters of reference indicate like parts.

This invention is based on the employment of the gravity combined with the centrifugal power for the purpose of producing motive power of vessels, locomotives, or of any machines whatever, whereby a motive power is obtained which is by far the cheapest ever known, and which is capable of imparting to vessels or railroad-cars a greater speed than hitherto attained.

My motive power consists, essentially, of a shaft, $a$, from which extend four (more or less) arms, $b$. To the outer ends of these arms are secured heavy weights $c$, made in the form of balls or disks, or in any other convenient form or shape. The shaft $a$ has its bearings in standards $d$, and it bears a belt-wheel, $e$, which connects by a belt, $f$, with another belt-wheel, $g$, mounted on a secondary shaft, $h$. This shaft has its bearings on standards $i$, and a rapid revolving motion is imparted to it by connecting it with the driving-shaft $j$. The motion thus imparted to the shaft $h$ is transmitted to the main shaft $a$, on which is mounted a cog-wheel, $k$. This wheel turns loosely on said shaft, and it is combined with a suitable clutch-coupling, $l$, whereby it can be rendered rigid with the shaft whenever it may be desired.

A friction-clutch, however, is preferable for this purpose to the spur-clutch shown in the drawings, so that the cog-wheel is not compelled to move instantaneously with the shaft when the clutch is thrown in gear.

The cog-wheel $k$ gears in a similar cog-wheel, $n$, mounted on the shaft or axle $o$, to which motion is to be imparted, and which, in the drawings, represents the axle of a railroad-car.

After the shaft $a$, with the centrifugal weights $c$, has attained a high velocity the cog-wheel $k$ is thrown in gear with said shaft, and the centrifugal force of said weights is rendered available to impart a rapid and powerful motion to the axle or shaft $o$, or to propel the car with great velocity.

What I claim as new, and desire to secure by Letters Patent, is—

The centrifugal weights $c$, in combination with the shaft $a$, cog-wheel $k$, clutch $l$, cog-wheel $n$, and shaft or axle $o$, all constructed and operating substantially as and for the purpose described.

J. ADAM SCHÜLE.

Witnesses:
M. M. LIVINGSTON,
W. HAUFF.